United States Patent [19]
Rosholm et al.

[11] Patent Number: 6,107,455
[45] Date of Patent: *Aug. 22, 2000

[54] REMOVAL OF PROTEIN FROM NATURAL RUBBER LATEX ARTICLES

[75] Inventors: Peter Rosholm; Kai Chuang Heng, both of Kuala Lumpur, Malaysia; Søren Højfeldt Lund, Curitiba, Brazil

[73] Assignee: Novo Nordisk A/S, Bagsvaerd, Denmark

[*] Notice: This patent issued on a continued prosecution application filed under 37 CFR 1.53(d), and is subject to the twenty year patent term provisions of 35 U.S.C. 154(a)(2).

[21] Appl. No.: 08/973,578

[22] PCT Filed: Apr. 30, 1996

[86] PCT No.: PCT/DK96/00194

§ 371 Date: Dec. 8, 1997

§ 102(e) Date: Dec. 8, 1997

[87] PCT Pub. No.: WO97/01581

PCT Pub. Date: Jan. 16, 1997

[30] Foreign Application Priority Data

Jun. 27, 1995 [DK] Denmark .................. 0746/95
Jun. 27, 1995 [DK] Denmark .................. 0746/95
Jan. 18, 1996 [DK] Denmark .................. 0045/96

[51] Int. Cl.⁷ ........................................ C08C 1/04
[52] U.S. Cl. .................. 528/488; 528/490; 528/932; 523/332; 524/925; 435/209; 435/269
[58] Field of Search ...................... 528/488, 490, 528/932; 435/262, 209; 524/925; 523/332

[56] References Cited

U.S. PATENT DOCUMENTS

| | | | |
|---|---|---|---|
| 2,116,089 | 5/1938 | Wallerstein ............... | 528/932 |
| 4,526,698 | 7/1985 | Kuroda et al. ............. | 252/99 |
| 4,620,936 | 11/1986 | Kielman et al. ........... | 252/99 |
| 5,622,646 | 4/1997 | Scialla et al. ............ | 510/311 |

FOREIGN PATENT DOCUMENTS

| | | |
|---|---|---|
| 44456/93 | 2/1994 | Australia . |
| 63069/94 | 11/1994 | Australia . |
| 63070/94 | 11/1994 | Australia . |
| 0584597 A1 | 3/1994 | European Pat. Off. . |
| 0624601 A1 | 11/1994 | European Pat. Off. . |
| 0630907 A1 | 12/1994 | European Pat. Off. . |

*Primary Examiner*—Andrew E. C. Merriam
*Attorney, Agent, or Firm*—Steve T. Zelson, Esq.; Reza Green, Esq.

[57] ABSTRACT

A method for lowering the extractable protein content in a natural rubber latex to below 30 parts per million (ppm) comprises the steps of treating by washing a rubber article, such as a rubber glove, with an aqueous solution containing a soluble silicate and, optionally, a protease. The methods claimed effectively reduce the allergenicity of the articles so treated.

19 Claims, No Drawings

REMOVAL OF PROTEIN FROM NATURAL RUBBER LATEX ARTICLES

TECHNICAL FIELD

This invention relates to the production of natural rubber latex articles having a low protein content.

BACKGROUND ART

Articles made from natural rubber latex generally contain protein, and this may give rise to a variety of undesirable effects in the finished article, including allergic reactions in articles intended for use in contact with human skin, e.g. surgical gloves, medical catheters, household gloves and condoms.

The protein content in rubber latex articles is commonly expressed in two different ways: as total extractable protein (EP) and as protein antigen. The total extractable protein (EP) can be measured, e.g., by the Lowry protein assay. The protein antigen expresses the allergenicity of the protein in the article; it may be measured, e.g., by the ELISA assay method.

A number of methods have been proposed to reduce the protein content or to alleviate the allergic reactions in articles made of natural rubber latex. Thus, Novo Nordisk A/S in *Research Disclosure,* Mar. 10, 1992, No. 335102 discloses that treatment of latex or latex goods with a protease is effective for changing the proteins to non-antigens and also for reducing the amount total protein in latex goods such as gloves. AU-A-44456/93 (Sumitomo Rubber Ind. & Kao Corp.) discloses a treatment of natural rubber latex with a protease, an anionic surfactant and/or a non-ionic surfactant. AU-A-63069/94 and AU-A-63070/94 (both to Sumitomo Rubber Ind. & Kao Corp.) disclose a treatment of a natural rubber latex with a protease and a surfactant, followed by the addition of, an anionic, amphoteric or non-ionic surfactant, oligomer or polymer, to improve the mechanical stability.

SUMMARY OF THE INVENTION

Surprisingly, we have found that the extractable protein content of a rubber latex article can be reduced by washing the article with a solution containing a soluble silicate. In a highly preferred embodiment, the solution also comprises a protease which serves to further reduce the extractable protein content and particularly to make the remaining protein less antigenic. With a combination of silicate and protease it is possible to reduce the protein antigen content to below the detection limit of the commonly used ELISA method.

Accordingly, the invention provides a method for producing a natural rubber latex articles, comprising washing the article with a solution comprising a soluble silicate and optionally a protease.

Another aspect of the invention provides a composition comprising a protease and a soluble silicate, in amounts which make the composition effective for use in lowering the extractable protein content of an article made of natural rubber latex.

DETAILED DESCRIPTION OF THE INVENTION

Natural Rubber Latex Article

The process of the invention is applicable to reducing the content of extractable protein in any article made of natural rubber article, particularly latex-dipped products. Some specific examples are surgical gloves, medical catheters, household gloves and condoms.

Soluble Silicate

The soluble silicate may be a crystalline alkaline silicate or a colloidal neutral silicate. It is preferably an alkali metal silicate, particularly a sodium silicate, preferably having a ratio of $Na_2O/SiO_2$ in the range from 2:1 to 1:3.75. Some specific examples are:

| Chemical name | Empirical formula | $Na_2O/SiO_2$ ratio |
| --- | --- | --- |
| Sodium orthosilicate | $Na_4SiO_4$ | 2:1 |
| Sodium sesquisilicate | $Na_6Si_2O_7$ | 1.5:1 |
| Sodium metasilicate | $Na_2SiO_3$ | 1:1 |
| Colloidal neutral silicate | — | 1:1.6 to 1:3.75 |

A suitable concentration of the soluble silicate is 0.2–10 g/l, preferably 1–5 g/l, in the solution used in the process of the invention or 10–90% by weight of the composition of the invention.

Protease

Any type of protease known to be effective on latex extractable protein or effective as a detergent additive can be used in the invention. An alkaline protease is preferred, e.g. an alkaline protease derived from Bacillus or Aspergillus, particularly a subtilisin. Some preferred proteases are Subtilisin 147 and Subtilisin 309 described in WO 89/06279 and Subtilisin Carlsberg. Also, a mixture of two or more proteases can be used, e.g. a mixture of 5 proteolytic components from *Aspergillus oryzae* described in WO 94/25580. Suitable protease preparations are commercially available from Novo Nordisk A/S under the trade names Alcalase®, Savinase®, Esperase® and Flavourzyme™. They are available both in liquid form and as non-dusting granulates.

The required concentration of the protease depends on the washing conditions (time, temperature etc.). For 5–15 minutes washing at 30–50° C., a suitable protease concentration corresponds to 0.5–100 KNPU/L, particularly 10–100 KNPU/L in the solution used in the process of the invention or 0.2–2 KNPU/g of the composition of the invention. KNPU is a protease activity unit, defined in U.S. Pat. No. 3,840,433.

Optional Ingredients

The removal of extractable protein may be enhanced by further adding a surfactant, preferably an amphoteric surfactant, and/or a second soluble electrolyte (in addition to the soluble silicate).

However, the use of an amphoteric surfactant tends to make the rubber latex articles more sticky and to increase foaming of the solution. It may therefore be preferred to avoid the use of a surfactant.

Also, other conventional additives may be included to enhance the effect of the protease, such as polyethylene glycol (PEG) and polymers like a polyacrylate or polyvinyl pyrrolidone.

Surfactant

If it is desired to use a surfactant, this may be amphoteric, anionic, non-ionic or a combination of these. It is particularly preferred to use an amphoteric surfactant or a combination of anionic and non-ionic surfactant.

A suitable concentration of the surfactant is 0.2–10 g/l, particularly 1–5 g/l in the solution used in the process of the invention or 3–30% by weight of the composition of the invention.

Amphoteric Surfactant

The amphoteric surfactant may be a propionate, e.g. tallow ampho-poly-carboxy-propionate (e.g. Ampholak™

7TY); an imino-dipropionate, e.g. complex coco-iminodipropionate (e.g. Ampholak YCE); an alkyl betaine, e.g. C-cetyl betaine having the formula $(CH_3)_3N^+$—CHR—COO (R=cetyl), available under the trade name Aquarex™ NS; an alkylamido betaine; an imidazoline derivative, or an alkyl poly-amino carboxylate (APAC).

A preferred amphoteric surfactant is a tallow ampho-polycarboxy-glycinate, particularly N-tallow alkyl poly-trimethylene poly-carboxymethyl sodium salts, available in aqueous solution as Ampholak™ 7TX from Berol Nobel. It has the formula:

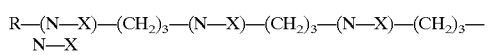

wherein $R=C_{16-18}$ and X=—$CH_2$—COONa.

Another preferred amphoteric surfactant is oleo-ampho-poly-carboxy-glycinate, available in powder form as Ampholak X07-SD55 from Berol Nobel.

Anionic Surfactant

The anionic surfactant may be an $\alpha$-olefin sulfonate (AOS), E.G. Lion™ AOS, a linear alkylbenzene sulfonate (LAS), e.g. Miranil™, or an alkyl sulphate, e.g. lauryl sulfate or Sipon™ LS from Henkel.

Non-ionic Surfactant

The non-ionic surfactant may be an alcohol ethoxylate, e.g. Elfapur™ LM 75 S from Akzo Chemie or Dobange™ from Berol Nobel, or it may be a nonyl phenol ethoxylate, e.g. Elmulwin™ W from Bayer.

Second Soluble Electrolyte

The second soluble electrolyte may be an alkali metal salt (particularly a sodium salt) such as a sulphate, a carbonate, a bicarbonate, a chloride, a phosphate, a citrate or a combination of two or more of these.

A suitable concentration for the second soluble electrolyte is 1–10 g/l.

Washing Process

Suitable washing conditions are 1–60 minutes (particularly 5–30 minutes) washing at 20–70° C. (particularly 30–60° C.) and pH 10–12.5 (particularly 10.5–12). A suitable weight ratio between the natural rubber latex articles and the washing solution is in the range from 1:20 to 1:5.

The washing may be performed with gentle mechanical stirring. The washing is typically preceded by a prewashing with water and followed by rinsing with water and drying. As mentioned above, there is generally less foaming if the use of a surfactant is avoided, and this makes the rinsing more effective.

Composition for Use in Protein Removal

The composition of the invention may be provided in powder, liquid or slurry form. A specific example of the formulation is a powder formulation (to be used at a dosage of about 17 g/l) consisting of Savinase 8.0T (protease granulate with an activity of 8.0 KNPU/g) and sodium metasilicate at a weight ratio of 1:2 to 1:4.

EXAMPLES

In the Examples 1–4 and Comparative Example 1, natural rubber latex gloves were treated at the following conditions, unless otherwise noted:

Natural Rubber Latex Gloves

Weight: 9 g per glove

Extractable protein content: 600–1200 ppm (measured by the Lowry method).

The gloves used in each example were from the same batch.

Pre-wash

Temperature: ambient (22° C.)

Time: 15 minutes

Glove/water ratio: 1:10 w/w (e.g. 50 gloves of 9 g each washed with 4.5 l of solution).

Stirring: manual

Liquid: Tap water

Washing

Temperature: 50° C.

Time: as noted

Glove/water ratio: 1:10 w/w

Stirring: manual

Liquid: distilled water with additives as given in each example

Rinsing

Temperature: ambient (22° C.)

Time: 5 minutes

Liquid: running tap water

Stirring: manual

Drying

Temperature: 70° C.

Time: 30 minutes

Extractable Protein Determination

Determination of extractable protein in ppm by Lowry assay.

Ingredients Used

The following ingredients were used in the examples. Concentrations are given in w/w %.

Protease: Savinase 16.0 L NR, protease activity 16.0 KNPU/g

Silicate: Sodium metasilicate

Amphoteric surfactant: Ampholak 7 TX

Non-ionic surfactant: alcohol ethoxylate (Elfapur or Dobange)

Anionic surfactant: alkyl sulfate (Sipon)

Sulphate: Sodium sulphate

Example 1

Natural rubber latex gloves were washed with the solutions shown below. The results are given below as ppm of extractable protein after 5 and 15 minutes.

| Test No.    | 1   | 2   | 3   | 4   | 5   | 6   | 7   |
|-------------|-----|-----|-----|-----|-----|-----|-----|
| Silicate    | 1   | 1   | 1   | 1   | 1   | 0.5 | 0.5 |
| Protease    | 0.1 | 0.1 | 0.1 | 0.1 | 0.1 | 0.1 | 0.1 |
| Amphoteric  | —   | —   | 0.5 | 0.5 | 1   | 1   | 0.5 |
| Non-ionic   | —   | —   | —   | —   | —   | —   | 0.5 |
| Sulphate    | —   | 0.3 | —   | 0.3 | —   | 0.3 | 0.3 |
| 5 min.      | 40  | 37  | 23  | 26  | 25  | 27  | 24  |
| 15 min.     | 31  | 29  | 22  | 22  | 21  | 24  | 22  |

It is seen that the extractable protein content can be brought down to about 30 ppm after 15 minutes washing with silicate and protease, and that it can be brought further down to about 22 ppm by addition of amphoteric surfactant.

Example 2

Natural rubber latex gloves were washed with the solution shown below, with or without protease:

| | |
|---|---|
| Silicate | 0.3 |
| Protease | 0 or 0.1 |
| Anionic | 0.5 |
| Nonionic | 0.1 |
| Sulphate | 0.3 |

Total extractable protein was measured by Lowry, and the extractable protein antigen was measured by ELISA. Results:

| | Without protease | | With protease | |
|---|---|---|---|---|
| Time, min. | Lowry, ppm | ELISA, ppm | Lowry, ppm | ELISA, ppm |
| 5 | 38 | 0.6 | 33 | 0 |
| 10 | 35 | 0.35 | 30 | 0 |
| 15 | 24 | 0.65 | 25 | 0 |

The results show that silicate together with surfactant and sulphate was effective in removing the extractable protein (Lowry), increasing with longer washing time to a level below 30 ppm. The addition of a protease was very effective in removing the allergenicity of the remaining protein to a level below the detection limit, and the protease also accelerated the reduction of extractable protein.

Example 3

Repeated washing tests were carried out with 3 different formulations, as shown below, using gloves of different batches. The results are given as average extractable protein content after 5, 10 and 15 minutes washing.

| Test No. | 1 | 2 | 3 |
|---|---|---|---|
| Silicate | 0.3 | 0.3 | 0.3 |
| Protease | 0.1 | 0.1 | 0.1 |
| Anionic | 0.5 | 0.6 | 0.5 |
| Non-ionic | 0.1 | 0.1 | 0.1 |
| Sulphate | 0.3 | 0.3 | 0.3 |
| Repetitions | 10 | 12 | 4 |
| 5 min. | 42 | 38 | 37 |
| 10 min. | 36 | 34 | 32 |
| 15 min. | 34 | 29 | 28 |

The results show that the extractable protein content can be reduced to about 30 ppm by 15 minutes washing with silicate and protease together with surfactants and sulphate.

Comparative Example 1

For comparison, gloves were washed without silicate, in water with or without protease (0 or 0.1% Savinase). The total extractable protein was measured by Lowry analysis, and the extractable protein antigen was measured by ELISA. Results:

| | Without protease | | With protease | |
|---|---|---|---|---|
| Time min | Lowry ppm | ELISA ppm | Lowry ppm | ELISA ppm |
| 0 | 739 | 41.4 | 739 | 41.4 |
| 5 | 58 | 3.2 | 101 | <0.6 |
| 15 | 57 | 2.2 | 77 | <0.6 |
| 30 | 43 | 1.2 | 80 | <0.6 |

The results show that a treatment with protease alone is effective in removing protein antigens, but does not reduce the total amount of extractable protein.

Example 4

Natural rubber latex gloves were washed for 15 minutes with the solutions shown below. In this experiment, no pre-wash was used. The results are given as ppm of extractable protein. The control (untreated gloves) contained 750 ppm of Lowry protein.

| | Invention | Reference |
|---|---|---|
| Silicate | 1.0 | — |
| Protease | 0.1 | 0.1 |
| Amphoteric | 0.5 | — |
| pH | 12 | 12 |
| ppm protein | 30 | 72 |

The results show a significant reduction of the protease content by the use of soluble silicate, compared to protease alone.

Example 5

In this experiment, natural rubber latex gloves were washed in a washing machine, using the following procedure. The glove:water ratio was 1:10, and the time for 1 cycle wash was 1 hour.

| Step | Operation | Time (min.) | Temperature |
|---|---|---|---|
| 1 | Pre-wash | 6 | 30 |
| 2 | Drop bath | 1 | — |
| 3 | Main wash | 15 | 50 |
| 4 | Drop bath + spinning | 1.5 | — |
| 5 | Rinsing | 5 | 30 |
| 6 | Drop bath + spinning | 1.5 | — |
| 7 | Powder re-coating + spinning | 5 | 30 |
| 8 | Drying | 30 | 70 |

With each of the solutions shown below, the pH of the solution and the extractable protein (Lowry) after washing were measured. The control (untreated gloves) contained 750 ppm of Lowry protein. Results:

| | Silicate | Amphoteric | Protease | pH | Lowry (ppm) |
|---|---|---|---|---|---|
| Invention | 0.5 | — | — | 10.5 | 22.5 |
| | 0.5 | 0.5 | — | 10.6 | 14.5 |
| | 0.5 | — | 0.1 | 10.5 | 18 |
| | 0.5 | 0.5 | 0.1 | 10.6 | 17 |
| | 1.0 | 0.5 | 0.1 | 11.8 | 10.5 |

-continued

|           | Silicate | Amphoteric | Protease | pH   | Lowry (ppm) |
|-----------|----------|------------|----------|------|-------------|
|           | 0.3      | —          | 0.1      | 10.2 | 28          |
|           | 0.2      | 0.2        | 0.1      | 10.2 | 18          |
|           | 0.1      | 0.05       | 0.1      | 10.2 | 25          |
| Reference | —        | —          | —        | 9.5  | 74          |

The above results demonstrate the excellent performance of the soluble silicate. The protein content could be brought down to below 30 ppm by the use of 0.5% silicate alone or by a combination of silicate with surfactant and/or protease.

The stickiness of the gloves after the washing was compared qualitatively. It was found that those treated with silicate together with amphoteric surfactant were more sticky than those treated with silicate alone, indicating that it may be preferable to avoid the use of a surfactant.

What is claimed is:

1. A method for lowering the extractable protein content of an article made of natural rubber latex, comprising washing the article with an aqueous solution comprising a water-soluble silicate, under conditions in which said article, after said washing, contains about 30 or less ppm extractable protein.

2. The method of claim 1 wherein the soluble silicate is an alkali metal salt of a crystalline alkaline silicate or colloidal neutral silicate.

3. The method of claim 1, wherein the soluble silicate is a sodium salt of a crystalline alkaline silicate or colloidal neutral silicate having a molar ratio of $Na_2O/SiO_2$ in the range from 2:1 to 1:3.75.

4. The method of the claim 1, wherein the soluble silicate is sodium metasilicate.

5. The method of claim 3, wherein the soluble silicate is a sodium salt of a colloidal neutral silicate having a molar ratio of $Na_2O/SiO_2$ in the range from 1:1.6 to 1:3.75.

6. The method of claim 1 wherein the soluble silicate is present in said aqueous solution at a concentration of 0.2–10 g/l.

7. The method of claim 1, wherein the solution further comprises a protease.

8. The method of claim 7 wherein the protease is an alkaline protease.

9. The method of claim 7, wherein the protease is an alkaline Bacillus protease.

10. The method of claim 7 wherein the protease is present in said aqueous solution at a concentration corresponding to 0.5–100 protease activity units (KNPU)/L.

11. The method of claim 1 wherein the solution further comprises a surfactant, wherein said surfactant is present in said solution at a concentration of 0.2–10 g/l.

12. The method of claim 1 wherein the solution further comprises an alkali metal salt selected from the group consisting of a sulfate, a carbonate, a bicarbonate, a chloride, a phosphate, a citrate, or a combination of any of the foregoing, wherein said salt is present in said solution at a concentration of 1–10 g/l.

13. The method of claim 1 wherein the solution has a pH in the range 10–12.5.

14. The method of claim 1 wherein the washing is carried out at a temperature of 20–70° C.

15. The method of claim 1 wherein the washing is carried out for a period of 1–60 minutes.

16. The method of claim 1 wherein the natural rubber latex article and the solution are present in a weight ratio of 1:20 to 1:5.

17. The method of claim 1, wherein said washing is preceded by a pre-wash and followed by rinsing and drying.

18. A method for lowering the extractable protein content of an article made of natural rubber latex, comprising washing the article with an aqueous solution comprising (i) a water-soluble silicate and (ii) a protease, under conditions suitable for reducing allergenicity of said article.

19. The method of claim 18 wherein said protease is Subtilisin 309.

* * * * *